US006482456B1

(12) United States Patent
Yokoo et al.

(10) Patent No.: US 6,482,456 B1
(45) Date of Patent: Nov. 19, 2002

(54) METHOD FOR PRODUCING LOW ACID BEVERAGE

(75) Inventors: Yoshiaki Yokoo, Osaka (JP); Shigemi Matsumoto, Osaka (JP); Yoshiko Hino, Osaka (JP); Nobuya Matsumoto, Osaka (JP)

(73) Assignee: Suntory Limited, Osaka (JP)

( * ) Notice: Subject to any disclaimer, the term of this patent is extended or adjusted under 35 U.S.C. 154(b) by 0 days.

(21) Appl. No.: 09/596,201

(22) Filed: Jun. 16, 2000

(30) Foreign Application Priority Data

Jun. 18, 1999 (JP) ............................. 11-171989

(51) Int. Cl.[7] ............... A23B 4/20; A23C 9/13; A23L 2/00
(52) U.S. Cl. ............... 426/330.3; 426/590; 426/594; 426/597; 426/656
(58) Field of Search ............... 426/330.3, 590, 426/594, 597, 656

(56) References Cited

FOREIGN PATENT DOCUMENTS

| JP | 63185352 | * | 6/1988 |
| JP | 9-9935 | | 1/1997 |
| JP | 9-37714 | | 2/1997 |
| JP | 411092385 | * | 4/1999 |
| JP | 2000248276 | * | 9/2000 |

OTHER PUBLICATIONS

Suita et al, "Production of Canned beverages . . . ", Beverage Japan, No. 80, pp. 67–71, Aug. 1998.
Suita et al, "Production of Canned beverages . . . ", Beverage Japan, No. 81, pp. 72–74, Sep. 1998.
Japanese Food Sanitation Law, 1987 (Standards for the Foods and Additives, D, each Article), pp. 225–226.
Aoyama, et al, "Change of milk proteins in white coffee . . . ", Nippon Nogeikagaku Kaishi, vol. 72, pp.310, 3B7a4, 1998.
TSAI et al, "Antibacterial Activity of Shrimp . . . ", Journal of Food Protection, vol. 62, No. 3, pp. 239–243, 1999.
Okano et al, "Calcium Absorption Accelerating . . . ", Chitin and Chitosan Research, vol. 4, No. 2, pp. 170–171, 1998.
Okuka et al, "Mechanisms of Anti–Obese Actions . . . ", Chitin and Chitosan Research vol. 4, No. 2, pp. 166–167, 1998.
Okamoto et al, "Mechanism of Analgesic Effect Inducing . . . ", Chitin and Chitosan Reasearch vol. 4, No. 2, pp. 172–173, 1998.

* cited by examiner

*Primary Examiner*—Helen Pratt
(74) *Attorney, Agent, or Firm*—Nixon & Vanderhye P.C.

(57) ABSTRACT

A method for producing a low acid beverage in which a deterioration in quality associated with a pH decrease during heat sterilization or long-term storage in a heated condition is eliminated or minimized, and which is characterized by adding at least one of chitosan, chitosan oligosaccharide and glucosamine.

8 Claims, 2 Drawing Sheets

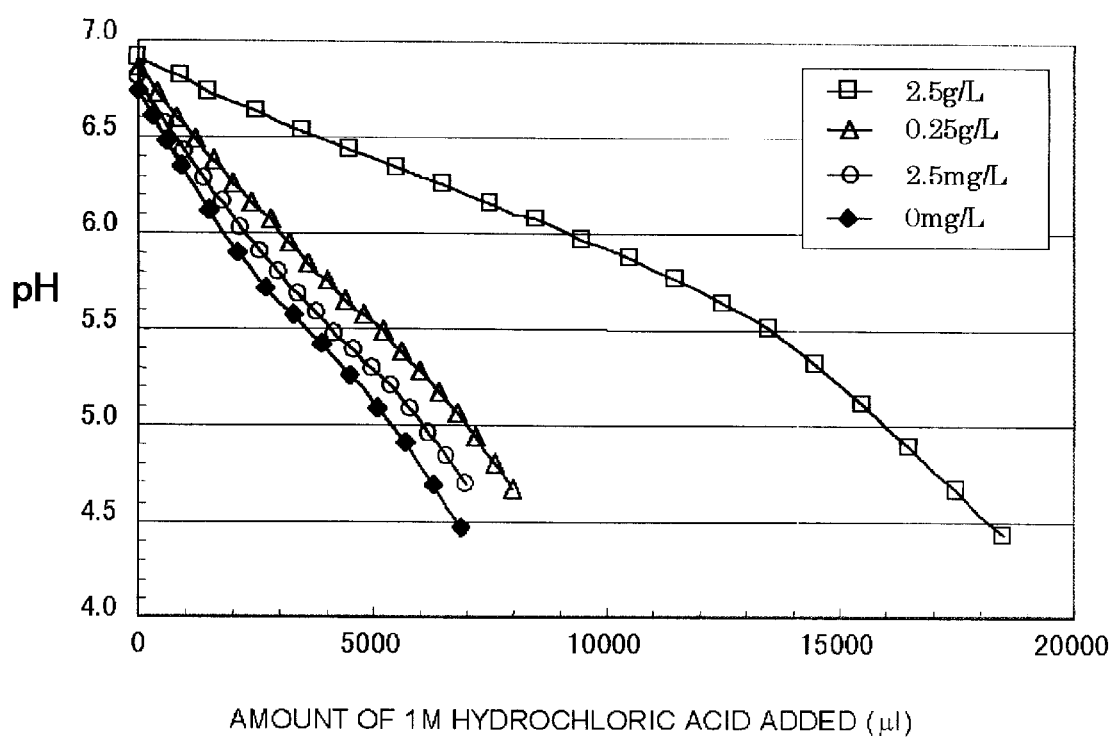

METHOD FOR PRODUCING LOW ACID BEVERAGE

BACKGROUND OF THE INVENTION

This invention relates to a method for producing a low acid beverage in which deterioration in quality associated with a pH decrease during heat sterilization or during long-term storage in a heated condition is minimized or eliminated.

Non-carbonated canned beverages can be generally classified into two types depending on the hydrogen ion concentration exponent (hereinafter referred to as "pH") of the contents: acid beverages having a pH of less than 4.6, which include fruit drinks, sport drinks, tomato juice, and so on; and low acid beverages having a pH of 4.6 or above, which include black coffee, white coffee, milk tea, milk, green tea, soup, and so on (Beverage Japan No. 80, August 1988, "Production of Canned Beverages"). Under the Japanese Food Sanitation Law (Standards for the Foods and Additives, D, each Article), beverages that have a pH of 4.6 or above, and water activity in excess of 0.94 are required to be sterilized by a method such as is effective in destroying microorganisms introduced into beverages from raw material sources, etc. and which have the ability to survive and proliferate in such beverages. Low acid beverages generally require heat sterilization at 100° C. or above.

However, heat sterilization causes a decrease in the pH of low acid beverages. Furthermore, long-term storage in a heated condition (55 to 60° C.) such as is employed in vending machines also causes a decrease in pH. In addition, environmental factors may cause a rise in temperature of beverages during storage or distribution, thus similarly affecting the pH thereof.

Decreases in the pH of such beverages impart an undesirable acid taste and tend to impair flavor. Particularly, beverages containing milk, typified by canned white coffee, are subject to the problem that milk proteins tend to aggregate and precipitate, and milk fats tend to separate out if the pH of the beverages decreases to 6 or below (Journal of the Agricultural Chemical Society of Japan, A collection of summaries of lectures at the 1998 Congress, page 310, 3B7a4, Aoyama et al.).

As a means of solving the various problems associated with pH decreases as discussed above, one alternative is to increase pH buffering action. However, merely increasing the added amount of a pH regulator, such as sodium bicarbonate (sodium hydrogen carbonate) or disodium hydrogenphosphate, which has been employed as a means of regulating beverage pH levels or increasing buffering action, results in various undesirable effects as regards taste and texture. Specifically, a salty taste and sliminess tend to be imparted to the thus-treated beverage, and a thickening effect is evident in the texture. Thus, the original taste of a beverage will be impaired.

Japanese Unexamined Patent Publication No. 1997-37714 discloses a method for suppressing pH decreases, comprising incorporating a milk substitute component. However, this method comprises decreasing or eliminating lactose, a component which is considered to be responsible for acid formation, and the method does not in fact enhance pH buffering action. Moreover, the use of a milk substitute component is liable to change the flavor and taste of a beverage.

Japanese Unexamined Patent Publication No. 1997-9935 discloses a method by which various inorganic ion components, which are water-soluble forms of land plant ashes, exhibiting alkalinity, are added as pH regulators to beverages. However, this publication makes no concrete mention of a pH buffering action.

SUMMARY OF THE INVENTION

Therefore, the object of the present invention is to provide a low acid beverage which does not suffer from the problems of quality deterioration associated with pH decreases during heat sterilization or during long-term storage in a heated condition.

BRIEF DESCRIPTION OF THE DRAWINGS

The present invention will be more readily understandable from the detailed description given herein below, in conjunction with the accompanying drawings which are provided by way of illustration only, and thus are not limitative of the present invention, and wherein:

FIG. 3 shows titration curves of milk (25% v/v) solutions having various chitosan oligosaccharide concentrations.

DESCRIPTION

Figure 1:
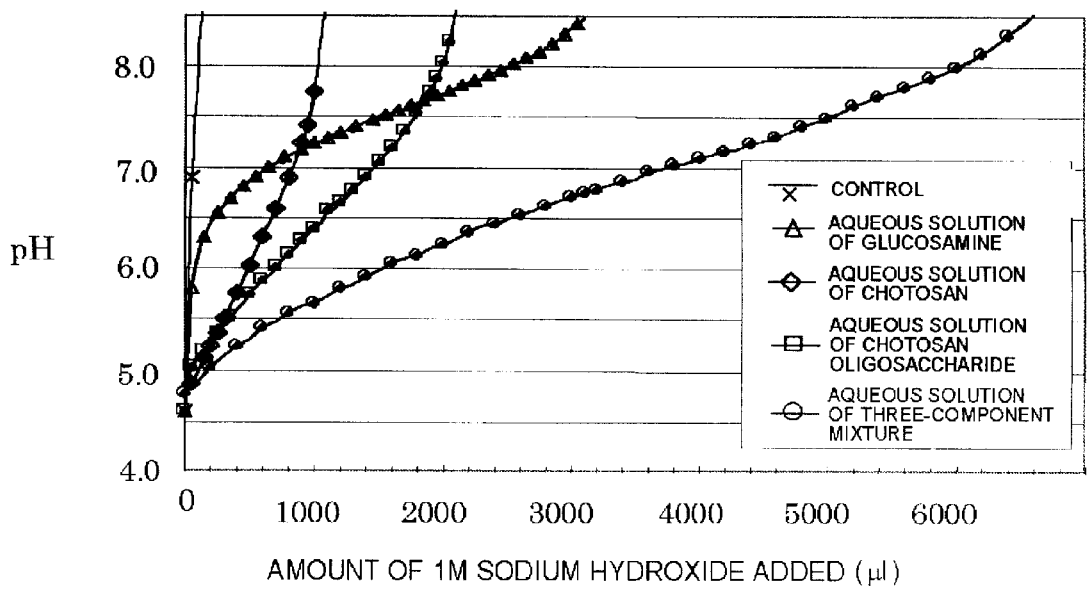
FIG. 1 shows titration curves of an aqueous solution of chitosan, an aqueous solution of chitosan oligosaccharide, an aqueous solution of glucosamine, and an aqueous solution of a mixture of chitosan, chitosan oligosaccharide and glucosamine (hereinafter referred to as a three-component mixture)

The inventors of this invention conducted extensive studies in an attempt to attain the above object. As a result, they found that aqueous solutions of chitosan, chitosan oligosaccharide and glucosamine, which are naturally occurring materials and are cations including amino groups, have a pH buffering action in the pH region of low acid beverages. This finding led to the accomplishment of the present invention. Specifically, the addition of at least one of chitosan, chitosan oligosaccharide and glucosamine to a low acid beverage can suppress a pH decrease, and inhibit or curtail various deterioration phenomena triggered by a pH decrease, such as flavor deterioration, milk separation, milk aggregation, and milk degradation.

That is, the present invention is a method for producing a low acid beverage, comprising adding at least one of chitosan, chitosan oligosaccharide and glucosamine. The invention will now be described in detail.

In the invention, a low acid beverage refers to a beverage in which the pH of the contents is 4.6 or above. The type of contents is not limited, and examples include coffee-containing beverages (black coffee, white coffee, etc.), tea-based beverages (green tea, oolong tea, black tea, barley water, blended tea, etc.), milk-containing beverages (milk beverages, white coffee, milk tea, milk shake, etc.), cocoa beverages, sweet drinks made from fermented rice, and soups. The containers are mainly metal (steel, aluminum) cans, but glass bottles, paper containers, and plastic containers may be used, without limitation. The method of sterilization during production is mainly retort sterilization, but production can be performed using hot fill or pasteurization, without limitation.

The chitosan, as used in the invention, refers to a basic polysaccharide ($\beta$-1,4-poly-D-glucosamine) obtained by deacetylating chitin, which is contained in invertebrates, such as crab, prawn, shrimp or lobster, krill, and insects, and fungi, by hydrolysis or the like, and purifying the product. The chitosan oligosaccharide refers to an oligosaccharide obtained by hydrolyzing chitosan with hydrochloric acid or an enzyme (chitonase or the like), and purifying the hydrolyzate. The glucosamine refers to an amino sugar (2-amino-2-deoxy-D-glucose) obtained by hydrolyzing chitosan with hydrochloric acid or an enzyme (chitonase or the like), purifying the hydrolyzate, and isolating the product.

Hydrolysis of chitin for deacetylation need not necessarily be complete. For the purposes of the present invention, it suffices for chitin to be hydrolyzed to such an extent that amino groups formed by deacetylation can buffer the pH of the low acid beverage. Methods of separation and purification for obtaining chitosan after deacetylating chitin, and methods of separation, purification and isolation for obtaining chitosan oligosaccharide or glucosamine after hydrolysis of chitosan are well known among people skilled in the art. As methods of separation, purification and isolation, methods such as washing with water, drying, grinding, filtration, and spray drying are usually used. However, these methods are not limitative, and other methods, such as centrifugation, membrane separation (ultrafiltration, micro filtration, etc.), solvent extraction, column chromatography, adsorbent methods, and crystallization, may be utilized, where necessary.

Chitosan, chitosan oligosaccharide and glucosamine can be obtained as commercially available products (products of Kimitsu Kagaku Kogyo (Tokyo Japan), Koyo Chemical (Tokyo, Japan), etc.). For example, chitosan with a deacetylation degree of about 60 to 90%, and chitosan oligosaccharide with a disaccharide to octasaccharide content of about 10 to 50% are commercially available.

In accordance with the inventors' research, chitosan, chitosan oligosaccharide and glucosamine have all been demonstrated to effectively suppress a deterioration in quality of low acid beverages which is associated with pH decreases. Thus, it is evident that monomers, oligomers and polymers of glucosamine, or their salts, including chitosan and chitosan oligosaccharide, effectively suppress quality deterioration of low acid beverages associated with pH decreases, regardless of the origins or preparation methods of those substances.

Chitosan, chitosan oligosaccharide, and glucosamine may be used in the form of free amines or as salts with suitable acids. Chitosan having a high molecular weight is sparingly soluble in water as a free amine, and its use as a salt is convenient. The form of the salt is not limited, as long as the salt is edible. Examples are salts containing organic acids, such as acetate, lactate and citrate, and salts containing inorganic acids, such as hydrochloride and sulfate. A preferred salt is a hydrochloride.

In the invention, chitosan, chitosan oligosaccharide, and glucosamine can be added during a suitable step for producing various low acid beverages. Methods for their addition include, for example, prior addition to the raw materials, addition during compounding of the raw materials, and addition after the compounded components are dissolved in water. The addition is advantageously performed before sterilization of low acid beverages, but in some cases may be performed after sterilization. Chitosan, chitosan oligosaccharide, and glucosamine are substantially harmless as foods, and nearly tasteless and odorless. The amount that can be added is not limited, and can be selected, as necessary, depending on the type of low acid beverage. When 25% (v/v) of milk is contained, for example, the concentration of chitosan oligosaccharide added is preferably in the range of 2.5 mg/L to 2.5 g/L, more preferably in the range of 0.25 g/L to 2.5 g/L.

Chitosan is known to have a variety of physiological actions, such as antibacterial activity (GUO-JANET SAI and WEN-HUEY SU; J. Food Prot., Vol. 62, No. 3, 1999, 239–243, others), a calcium absorption promoting effect (Okano et al.; Chitin and Chitosan Research Vol. 4, No. 2, 1998, 170–171), an anti-obesity action (Okuda et al.; Chitin and Chitosan Research Vol. 4, No. 2, 1998, 166–167), and an analgesic effect (Okamoto et al.; Chitin and Chitosan Research Vol. 4, No. 2, 1998, 172–173). Depending on the amount added to a low acid beverage, one or more of such effects may be expected. Also, Chitosan oligosaccharide and glucosamine, which are decomposition products of chitosan, will exhibit similar effects depending on the amount of Chitosan incorporated in the beverage.

The present invention will now be described in detail by way of the following Examples, which in no way limit the invention.

EXAMPLE 1

0.75 g of chitosan, chitosan oligosaccharide or glucosamine (hydrochloride; a product of Kimitsu Kagaku) was weighed, and dissolved in 300 ml of water to prepare three aqueous solutions with a final concentration of 2,500 ppm. Similarly, chitosan, chitosan oligosaccharide and glucosamine, each weighed in an amount of 0.75 g, were together dissolved in 300 ml of water to prepare an aqueous solution of a three-component mixture. As a control, 300 ml of water was used. These five solutions were each adjusted to be-provided with a pH of 4.6 with the use of a suitable amount of sodium hydroxide (NaOH) or hydrochloric acid (HCl), and then titrated with a 1M aqueous solution of NaOH. The results of this experiment are shown in FIG. 1.

FIG. 1 shows that the aqueous solutions containing chitosan, chitosan oligosaccharide and glucosamine, respectively, and the aqueous solution of the three-component mixture had a pH buffering action in the overall pH region of 4.6 or above.

EXAMPLE 2

0.75 g of chitosan, chitosan oligosaccharide or glucosamine (hydrochloride; a product of Kimitsu Kagaku) was weighed, and dissolved in 200 ml of water. Sodium bicarbonate was added to provide the solution with a pH of 6.8, and then 75 ml of milk and water were added to make the final volume 300 ml. In this manner, three milk (25% v/v) solutions with a final concentration of 2,500 ppm were prepared. As a control, 300 ml of a milk (25% v/v) solution was used. The resulting solutions were each titrated with a 1M aqueous solution of HCl. The results of this experiment are shown in FIG. 2.

Figure 2:
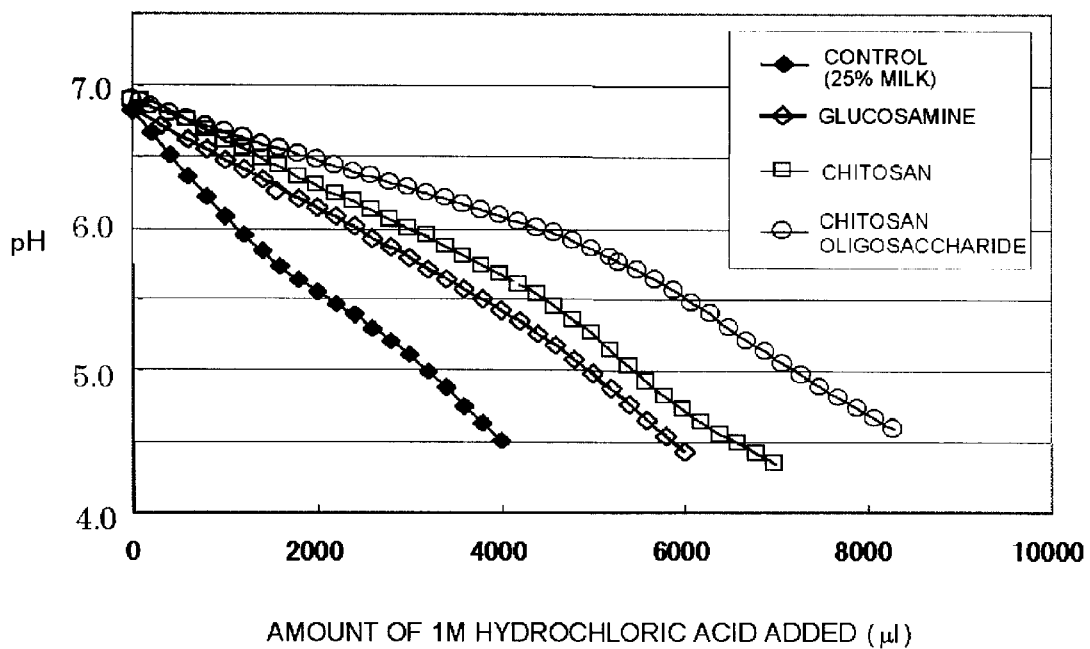
FIG. 2 shows titration curves of milk (25% v/v) solutions of chitosan, chitosan oligosaccharide and glucosamine.

FIG. 2 shows that the milk solutions containing chitosan, chitosan oligosaccharide and glucosamine, respectively, had a potent pH buffering action in the pH region of 6.8 to 4.6 in comparison with the control.

EXAMPLE 3

1.25 mg, 125 mg, and 1.25 g of chitosan oligosaccharide (hydrochloride; a product of Kimitsu Kagaku) were weighed, and each dissolved in 300 ml of water. Sodium bicarbonate was added to provide the solution with a pH of 6.8, and then 125 ml of milk and water were added to make a final volume of 500 ml. In this manner, milk (25% v/v) solutions-with various chitosan oligosaccharide concentrations were prepared. As a control, 500 ml of a milk (25% v/v) solution was prepared. The resulting solutions were each titrated with a 1M aqueous solution of HCl. The results of this experiment are shown in FIG. 3.

FIG. 3 shows that the milk solutions with various chitosan oligosaccharide concentrations had a potent pH buffering action in the pH region of 6.8 to 4.6 in comparison with the control. The pH buffering action increased in proportion to the amount of chitosan oligosaccharide added.

EXAMPLE 4

2.5 g of chitosan oligosaccharide (hydrochloride; a product of Keiai Kasei (Shizuoka, Japan)) was dissolved with 500 ml of water. An aqueous solution of sodium hydroxide was added to provide the solution with a pH of 6.8. Milk (250 ml) and water were added to provide a volume of 1,000 ml. The resulting mixture was heated to 65° C., and then homogenized to form a homogeneous mixture. The mixture was further heated to 85° C., and charged into a 190 g can. The charge was retort sterilized (125° C., 25 minutes) to obtain Test Product 1. Separately, a mixture prepared by adding water to 250 ml of milk to make a total volume of 1,000 ml was treated in the same manner as for Test Product 1, whereby Control 1 was obtained.

These milk-containing beverages were each stored for 2 weeks at 70° C. as an acceleration test comprising long-term storage in a heated condition. The results of pH measurements made before and after retort sterilization and after 2 weeks of storage are shown in Table 1. The results of sensory evaluation made after retort sterilization and after 2 weeks of storage are shown in Table 2.

As shown in Table 1, Test Product 1, a chitosan oligosaccharide-incorporating product, suppressed pH decreases arising from retort sterilization and storage in a heated condition, in comparison with Control 1.

TABLE 1

|  | pH | | |
| --- | --- | --- | --- |
|  | Before retort sterilization | After retort sterilization | After 2 weeks |
| Test Product 1 | 6.80 | 6.70 | 6.22 |
| Control 1 | 6.80 | 6.57 | 6.06 |

The sensory evaluation was carried out by a panel of 5 experts, who made assessments on a 5-point rating scale, in which "Good" is denoted by a score of 5, "Fair"=4, "Ordinary"=3, "substandard"=2, and "Poor"=1. Table 2 shows the average ratings. As is clear from Table 2, Test Product 1 received better evaluations than Control 1.

TABLE 2

|  | Average sensory rating | |
| --- | --- | --- |
|  | After retort sterilization | After 2 weeks |
| Test Product 1 | 3.6 | 3.2 |
| Control 1 | 3.0 | 2.8 |

EXAMPLE 5

Predetermined amounts of raw materials shown in Table 3 were compounded into liquids. These liquids were each homogenized to form a homogeneous mixture. The mixture was heated to 85° C., and then charged into a 190 g can. The charge was retort sterilized (125° C., 25 minutes) to obtain two coffee products containing milk (Test Product 2, Control 2). These products were each stored for 2 months at 55° C. as a long-term storage test in a heated condition. The results of pH measurements made before and after retort sterilization and after 2 months of storage are shown in Table 4. The results of sensory evaluation made after retort sterilization and after 2 months of storage are shown in Table 5.

TABLE 3

|  | Test Product 2 | Control 2 |
| --- | --- | --- |
| Coffee extract | 4 L | 4 L |
| Sugar | 0.7 kg | 0.7 kg |
| Skim milk powder | 0.02 kg | 0.02 kg |
| Sodium bicarbonate | 0.015 kg | 0.010 kg |
| Emulsifying agent | 5 g | 5 g |
| Milk | 2.5 L | 2.5 L |
| Chitosan Oligosaccharide | 10 g | None |
| Total volume (adjusted with water) | 10 L | 10 L |

As shown in Table 4, Test Product 2, a chitosan oligosaccharide-incorporating product, exhibited suppressed pH decreases arising from retort sterilization and storage in a heated condition at 55° C., as compared with Control 2.

TABLE 4

|  | pH | | |
| --- | --- | --- | --- |
|  | Before retort sterilization | After retort sterilization | After 2 months |
| Test Product 2 | 6.80 | 6.67 | 6.30 |
| Control 2 | 6.80 | 6.59 | 6.12 |

The sensory evaluation was carried out in the same manner as in the aforementioned Example 4. Table 5 shows the average evaluation ratings. As is clear from Table 5, Test Product 2 received better evaluations than Control 2.

TABLE 5

|  | Average sensory rating | |
| --- | --- | --- |
|  | After retort sterilization | After 2 months |
| Test Product 2 | 3.8 | 3.4 |
| Control 2 | 3.2 | 2.8 |

EXAMPLE 6

Predetermined amounts of raw materials shown in Table 6 were compounded into liquids. These liquids were each heated to 85° C., and then charged into a 190 g can. The charge was retort sterilized (125° C., 25 minutes) to obtain two canned tea products (Test Product 3, Control 3). These products were each stored for 2 weeks at 70° C. as an acceleration test comprising long term storage in a heated condition. The results of pH measurements made before and after retort sterilization and after 2 weeks of storage are shown in Table 7.

TABLE 6

| | Test Product 3 | Control 3 |
|---|---|---|
| Tea extract | 3 L | 3 L |
| Sugar | 0.3 kg | 0.3 kg |
| Sodium bicarbonate | 2 g | 1 g |
| Chitosan Oligosaccharide | 10 g | None |
| Perfume | 5 ml | 5 ml |
| Vitamin C | 1 g | 1 g |
| Total volume (adjusted with water) | 10 L | 10 L |

As is shown in Table 7, Test Product 3, a chitosan oligosaccharide-incorporating product, exhibited suppressed pH decreases arising from retort sterilization and storage in a heated condition, as compared with Control 3.

TABLE 7

| | pH | | |
|---|---|---|---|
| | Before retort sterilization | After retort sterilization | After 2 weeks |
| Test Product 3 | 5.60 | 5.42 | 5.21 |
| Control 3 | 5.60 | 5.30 | 5.02 |

EXAMPLE 7

Predetermined amounts of raw materials shown in Table 8 were compounded into liquids. These liquids were each homogenized to form a homogeneous mixture. The mixture was heated to 85° C., and then charged into a 190 g can. The charge was retort sterilized (125° C., 25 minutes) to obtain two canned milk beverages (Test Product 4, Control 4). These beverages were each stored for 2 weeks at 70° C. as an acceleration test comprising a long term storage in a heated condition. The results of pH measurements made before and after retort sterilization and after 2 weeks of storage are shown in Table 9.

TABLE 8

| | Test Product 4 | Control 4 |
|---|---|---|
| Milk | 9.94 L | 9.94 L |
| Emulsifying agent | 3 g | 3 g |
| Vitamin E | 1.0 g | 1.0 g |
| Sodium ferrous citrate | 0.5 g | 0.5 g |
| Chitosan Oligosaccharide | 20 g | None |
| Total volume (adjusted with water) | 10 L | 10 L |

As shown in Table 9, Test Product 4, a chitosan oligosaccharide-incorporating product, exhibited suppressed pH decreases arising from retort sterilization and storage in a heated condition, as compared with Control 4.

TABLE 9

| | pH | | |
|---|---|---|---|
| | Before retort sterilization | After retort sterilization | After 2 weeks |
| Test Product 4 | 6.80 | 6.68 | 6.46 |
| Control 4 | 6.80 | 6.60 | 6.31 |

While the present invention has-been described in the foregoing manner, it is to be understood that the invention is not limited thereby, and various modifications may be made. Such modifications do not depart from the spirit and scope of the invention, and all such modifications as are obvious to one skilled in the art are intended to be included within the scope of the claims.

What is claimed is:

1. A method for suppressing quality deterioration of a low acid milk-containing beverage which takes place in association with a pH decrease of the beverage, comprising adding to said beverage at least one pH buffering agent selected from the group consisting of a monomer, oligomer or polymer of glucosamine and an edible salt thereof in an amount from 0.00025 to 0.20% (w/v) to the beverage, wherein the pH of the freshly produced low acid beverage is from 5.0 to 7.0.

2. A method as claimed in claim 1, wherein the low acid beverage is a coffee-containing beverage.

3. A method as claimed in claim 1, wherein the low acid beverage is a tea-based beverage.

4. A method as claimed in claim 1, wherein the polymer of glucosamine is chitosan.

5. A method as claimed in any one of claims 1, 2 or 3, wherein the oligomer of glucosamine is chitosan oligosaccharide.

6. A method as claimed in claim 1, wherein the oligomer of glucosamine is chitosan oligosaccharide.

7. A milk-containing low acid beverage containing at least one pH buffering component selected from the group consisting of a monomer, oligomer or polymer of glucosamine and an edible salt thereof produced by the process of claim 1.

8. A low acid beverage as claimed in claim 7, wherein the pH of the freshly produced low acid beverage is from 5.0 to 7.0, and the pH buffering component is contained in an amount from 0.00025 to 0.20% (w/v) to the beverage.

* * * * *